United States Patent [19]

Vogler

[11] 4,394,785
[45] Jul. 26, 1983

[54] APPARATUS FOR CLEANING SOLDERING IRON BITS

[75] Inventor: Franz Vogler, Niederrohrdorf, Switzerland

[73] Assignee: Elvo Elektronik AG, Niederrohrdorf, Switzerland

[21] Appl. No.: 310,777

[22] Filed: Oct. 13, 1981

[30] Foreign Application Priority Data

Mar. 6, 1981 [CH] Switzerland .......................... 1524/81

[51] Int. Cl.³ ............................................. A46B 13/02
[52] U.S. Cl. ....................................... 15/21 D; 15/77; 15/97 R
[58] Field of Search .............. 15/21 D, 39, 40, 97 R, 15/102, 77, 88; 228/57

[56] References Cited

U.S. PATENT DOCUMENTS

| | | | |
|---|---|---|---|
| 885,497 | 4/1908 | Maibaum | 15/39 |
| 2,036,840 | 4/1936 | Thiesen | 15/39 |
| 2,524,214 | 10/1950 | Webster et al. | 15/39 |
| 2,704,374 | 3/1955 | Barklow | 15/39 |
| 2,864,103 | 12/1958 | Gerber | 15/21 D |
| 3,008,161 | 11/1961 | Jensen | 15/21 D |
| 3,761,984 | 10/1973 | Hauschild | 15/39 X |
| 3,892,004 | 7/1975 | Downes | 15/102 |
| 4,263,745 | 4/1981 | Salahshour | 15/102 X |

Primary Examiner—Edward L. Roberts
Attorney, Agent, or Firm—Werner W. Kleeman

[57] ABSTRACT

For cleaning hot soldering iron bits which are contaminated or soiled by tin oxides and soldering residues a flat felt or sponge has often been heretofore used. This cleaning technique is impractical, incomplete and frequently causes spatters of soldering tin or pewter at the place of work. This is unacceptable, especially when precision soldering electronic devices. This problem is solved by using an apparatus driven by an electric motor. The hot soldering iron bit or tip is momentarily placed between two cleaning bodies which rotate towards each other. These two rotating cleaning bodies thus enclose the soldering iron bit and protectively clean the same. The cleaning bodies are mounted in a removable holder or cage provided with a tin collection container or receptacle. For enhancing the self-cleaning action of the two cleaning bodies the spacing between the axes or shafts of the two cleaning bodies is smaller than the mean diameter of both cleaning bodies. Additionally, two strippers or scrapers engage into each cleaning body.

16 Claims, 9 Drawing Figures

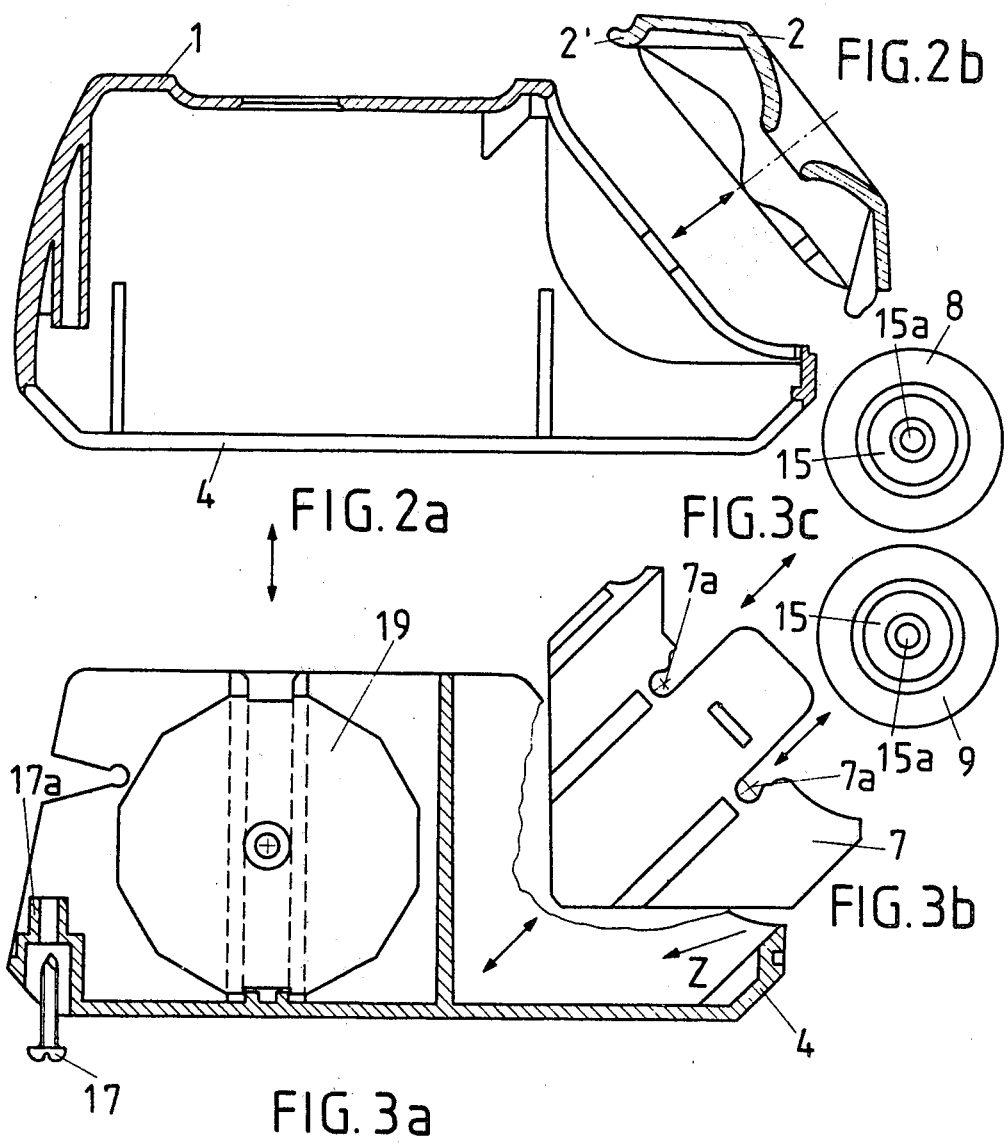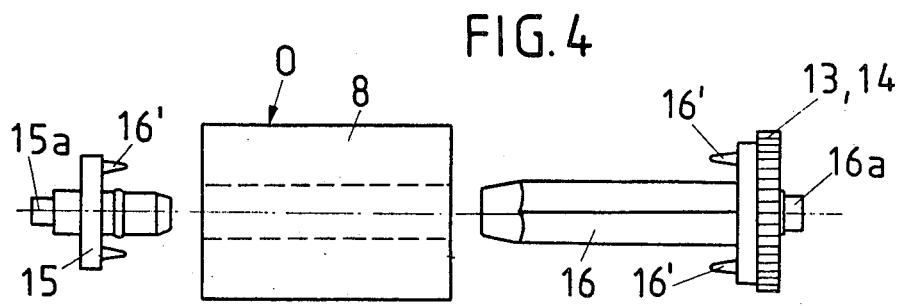

APPARATUS FOR CLEANING SOLDERING IRON BITS

BACKGROUND OF THE INVENTION

The present invention relates to a new and improved apparatus for mechanically cleaning hot soldering iron bits which have been contaminated or soiled by tin oxides and soldering residues.

During the mass production of electronic circuit arrangements numerous soldering connections are manually made by means of an electric soldering iron. The increasing integration density of the components at low voltages and currents inevitably leads to contact points which are increasingly located closer to one another, and therefore accordingly requires high-grade or precision solder connections.

It is of particular importance that the soldering bit be free of slag or scale, also referred to as solder fins or tabs. To fulfill this requirement there is made available at most manufacturing establishments for the solder equipment operator a felt or flat sponge at which the operator may clean, usually incompletely, at various or irregular time intervals the soldering iron bit by scraping or striking the soldering iron bit against such felt or flat sponge.

There have been made various attempts to attain a soldering iron bit for soldering operations which is at all times clean. For instance, an apparatus and method for cleaning a special capillary soldering iron is known to the art from U.S. Pat. No. 3,977,036, granted Aug. 31, 1976, wherein there is provided a water container for imbuing a cleaning sponge and an oil container for temperature stabilization, greasing or lubrication and protection of the soldering iron tip or bit against oxidation.

Such method is relatively complicated and requires special soldering devices which, especially with alternating series production work, are not universally employable. The use of such cleaning devices for standard soldering equipment appears to be unsuitable.

SUMMARY OF THE INVENTION

Therefore, it is a primary object of the present invention to provide an improved apparatus for cleaning soldering iron bits or tips which is not associated with the aforementioned drawbacks and limitations of the prior art constructions.

Another important object of the present invention is to provide an improved construction of cleaning apparatus which enables faultless cleaning of conventional soldering devices of different dimensions and output, while not damaging the electroplated iron coating applied to the copper soldering bit or tip.

Another important object of the present invention is to provide a new and improved construction of apparatus for cleaning soldering iron bits or tips in an extremely efficient, reliable and positive manner, and which cleaning apparatus is relatively simple in construction and design, highly reliable in operation, economical to fabricate, not readily subject to breakdown or malfunction and requires a minimum of maintenance and servicing.

Now in order to implement these and still further objects of the invention, which will become more readily apparent as the description proceeds, the cleaning apparatus for soldering iron bits or tips as contemplated by the present development is manifested by the features that there is provided at least one rotating cleaning body.

According to a further aspect of the invention it is possible to provide at least two oppositely situated rotatable cleaning bodies which rotate towards one another, i.e. in opposite directions. With this arrangement there is realised a simple possibility of inserting the soldering tip or bit between the cleaning bodies in order to clean such soldering tip completely at all sides.

Furthermore, the cleaning bodies can be arranged such that their lengthwise axes are essentially parallel to one another and each such cleaning body is mounted upon a related entrainment shaft. In this way it is possible to increase the service life of such cleaning bodies.

There also can be provided an imbuing or wetting device containing a cooling liquid, such as water, for the cleaning bodies. This wet cleaning affords the advantage of again increasing the efficiency of the cleaning action of the cleaning bodies and produces a particularly smooth surface at the soldering bit or tip.

An electric drive may be provided for the cleaning bodies so that there is realised convenient operation of the cleaning apparatus and, if desired, an intermittent drive of the equipment.

It is possible for the cleaning bodies to be driven to operate at different rotational speeds, thereby increasing the self-cleaning effect of the cleaning bodies. To that end, each cleaning body may be provided with its own drive so that the mentioned different rotational speeds can be readily obtained.

The cleaning bodies may be provided with a brush-like surface, and with this design such cleaning bodies are particularly suitable for the removal of tin and/or slag residues which adhere to the soldering tip or bit.

If the cleaning bodies have a porous surface then liquid can be absorbed by such cleaning body surfaces and there is thus ensured for a protective cleaning action, without the need to singe the surface of the cleaning body.

If the cleaning body is formed of a synthetic, high-molecular substance, such as polytetrafluoroethylene or chlorinated rubber or alloprene, then there is possible a dry cleaning of the soldering bit or tip. Hence, the temperature thereof, during the cleaning operation, remains approximately constant.

The body can be fabricated from a natural organic substance, such as a sponge or linen. This system design has been found extremely useful in practice, particularly when accomplishing a wet cleaning operation with water.

The cleaning bodies may be arranged within a housing equipped with a tin catch or collecting device. This equipment is particularly simple to clean and also remains clean during its operation. The housing also may be designed so that it can be opened, in order to thereby enhance the cleaning operation.

A particularly advantageous construction contemplates mounting the cleaning bodies in a removable cage or basket or the like. This equipment design enables also the flushing or washing of the cleaning bodies and their drive gears or the like.

The axial spacing of both cleaning bodies from one another, i.e. the distance between the lengthwise axes of both cleaning bodies, is advantageously smaller than their mean or average diameter. This affords the advantage of further increasing the self-cleaning action.

Within the equipment housing there may be arranged a liquid container equipped with a droplet forming and-/or spraying device. This system design is particularly suitable for larger size soldering irons, since during the cleaning of the soldering tip or bit there can be continuously replaced the part of the liquid which vaporises.

BRIEF DESCRIPTION OF THE DRAWINGS

The invention will be better understood and objects other than those set forth above will become apparent when consideration is given to the following detailed description thereof. Such description makes reference to the annexed drawings which depict an exemplary embodiment of the invention and wherein:

FIG. 2a is a partial sectional view of the housing of the cleaning apparatus according to FIG. 1;

FIG. 2b illustrates a cover or lid which can be mounted at the housing;

FIG. 3a is a partial sectional view of the housing of the solder tip cleaning apparatus according to FIG. 1 with an electrical drive flanged or otherwise affixed thereto;

FIG. 3b illustrates a cage or holder device for mounting the cleaning bodies;

FIG. 3c shows the cleaning bodies for the cage or holder device of FIG. 3b, with gears arranged at the end thereof;

FIG. 4 illustrates a cleaning body which can be arranged in the cage or holder device of FIG. 3b and before mounting it upon its entrainment shaft;

DETAILED DESCRIPTION OF THE PREFERRED EMBODIMENTS

Figure 1:
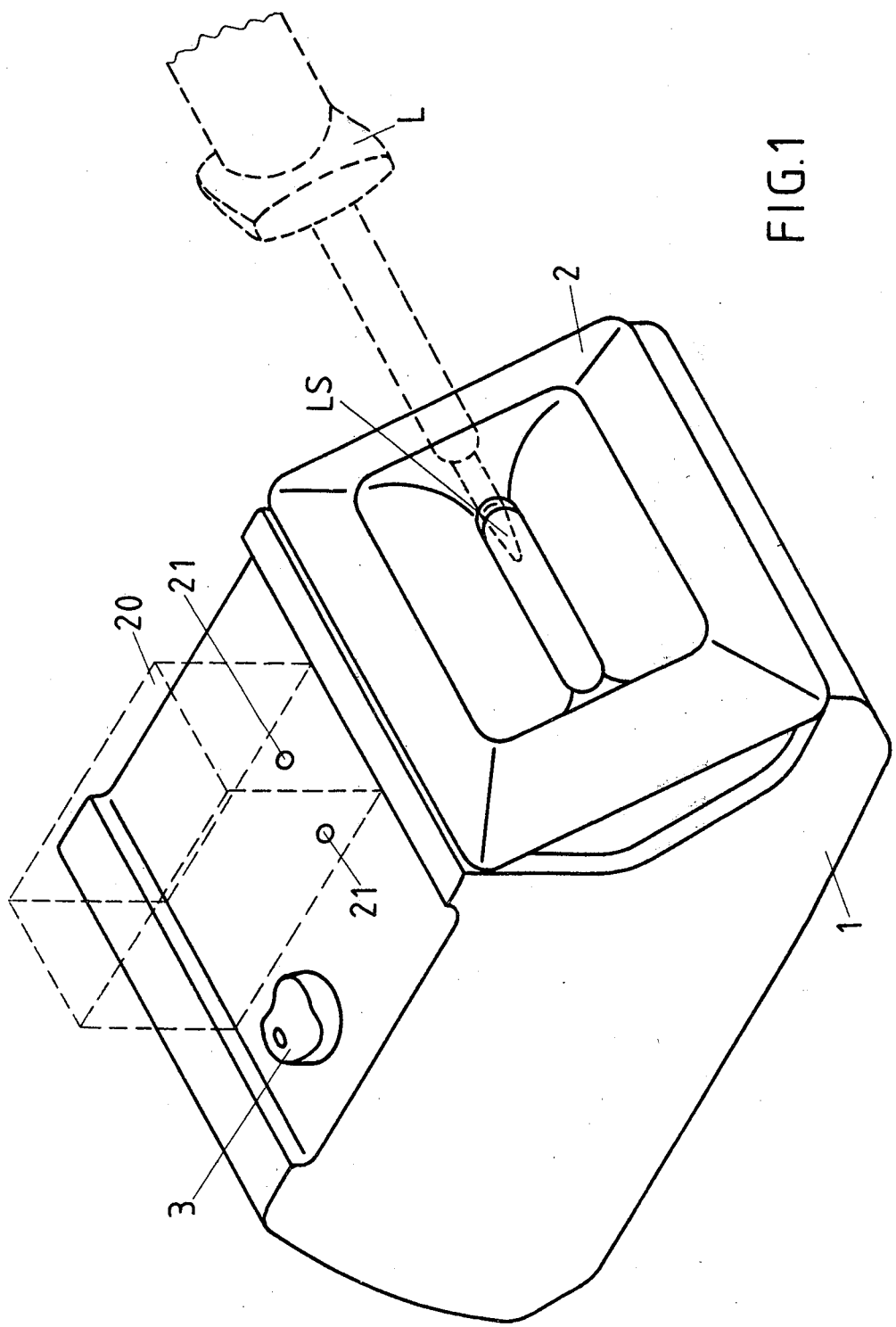
FIG. 1 illustrates the cleaning apparatus in its operational or working position.

In FIGS. 1 and 2 a housing upper part is generally designated by reference character 1. At one end or side of the housing portion 1 there is attached a substantially trough-shaped lid or cover 2. Into this lid or cover 2 there can be inserted the soldering tip or bit LS of a soldering iron L, both indicated by broken lines, for cleaning such soldering tip or bit L. A push button switch 3 or the like which is arranged at the upper side of the upper housing part 1 serves for placing the cleaning apparatus into operation.

Adjacent the push button switch 3 there is arranged a wetting or imbuing device 20, e.g. a water container, which has been here indicated by broken or phantom lines. At the bottom side or undersurface of the wetting or imbuing device 20 there are provided nozzle bores or ports 21 for the throughflow of the liquid.

The partial sectional view of FIG. 2a depicts that the housing 1, 4 comprises an upper housing part or portion 1 formed of polycarbonate (PC) and a lower housing part or portion 4 which is formed of another commercially available polycondensation product, such as polyphenylene oxide or "Noryl", a registered trademark of General Electric. Both housing parts 1 and 4 are manufactured by injection molding.

The substantially trough-shaped lid or cover member 2 provided with a clamping spring 2', as shown in FIG. 2b, is formed of a duromeric or duroplastic material, for instance, "Bakelite PH", and easily can be inserted into and removed from the upper housing part 1 in the direction of the double-headed arrow shown in FIG. 2a.

The lid or cover member 2 and the housing 1, 4 also can be provided with a suitable hinge arrangement for pivoting out the cover member 2 and, thus, opening the housing 1, 4.

FIG. 3a shows another sectional view of the bottom housing portion or part 4. There will be recognized an electrical drive or drive means 19 which may be a conventional synchronous motor equipped with suitable gearing. A threaded screw or bolt 17 can be inserted into a centering pin or socket 17a of the bottom part 4 of the housing 1, 4 and serves for fixing the upper housing part 1 of the housing shown in FIG. 2a.

FIG. 3b illustrates details of a cage or basket-like holder device 7 which can be inserted into the housing 1, 4 shown in FIGS. 2a and 3a in the direction of the illustrated double-headed arrow. In the cage or holding device 7 there are provided bearings or support locations 7a into which the bearing journals 15a and 16a, shown in FIG. 3c, of the cleaning bodies 8 and 9 are introduced to enable rotation of such cleaning bodies.

The cleaning bodies 8, 9 are constructed to be exchangeable and formed of a material which is accommodated to the related mode of operation of the cleaning apparatus.

Suitable cleaning bodies 8 and 9 can be formed of natural sponge having a correspondingly porous surface O for water absorption. Consequently, there is ensured for a high cleaning capacity and a high flexibility of the cleaning body.

In order to rotate the cleaning bodies 8 and 9 without slip there has been found to be suitable an entrainment arrangement according to the showing of FIG. 4. This entrainment arrangement comprises an entrainment shaft 16, an entrainment element 15 which can be inserted onto one end of the entrainment shaft 16, and entrainment clamps or claws 16' which can engage into the end face or side of the related cleaning bodies 8 and 9, which here may preferably consist of a natural sponge.

Arranged at an end face or side of the one entrainment shaft 16 is a gear 14 which has, for instance, 36 teeth. At the end face of the second entrainment shaft 16 there is arranged a gear 13 which has, for instance, 28 teeth. For instance, the upper cleaning body rotates at approximately 10 revolutions per minute, the lower cleaning body at approximately 7.8 revolutions per minute.

The entrainment shaft 16 with the gear 14 or 13, as the case may be, the entrainment claws 16' and the bearing journals 16a are each molded as one piece and from, for instance, a thermoplastic polyester (PBTB); the same is also true of the other entrainment element or part 15 with its bearing journal 15a and the entrainment claws 16'.

Figure 5:
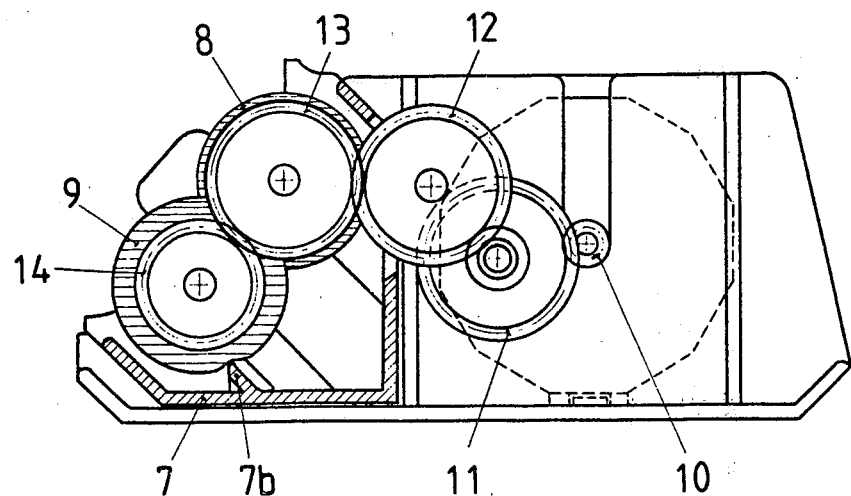
FIG. 5 illustrates the assembled drive of FIGS. 3a to 3c.

The entire arrangement of the drive with its drive gears 10 to 14 can be best seen in the partial sectional view of FIG. 5. Additionally, there is shown a stripper or scraper 7b which is mounted in the cage or basket-like holder device 7 and engages into the related cleaning body 9. Such stripper or scraper 9 serves to perform an intense kneading or surface agitation of the cleaning body 9, and thus, for the effective removal of tin residues and the like.

Figure 6:
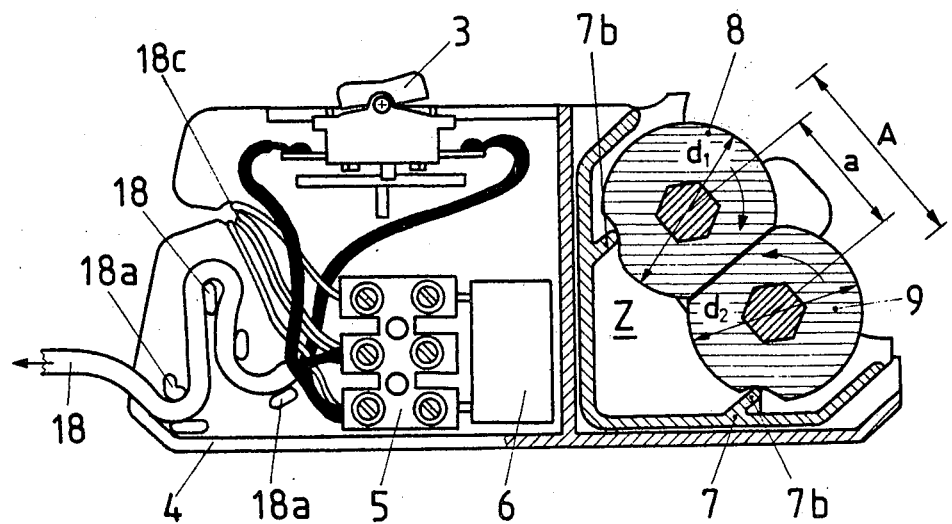
FIG. 6 is a partial front view and a sectional view of the housing of the cleaning apparatus according to FIG. 1.

FIG. 6 is another view depicting details of the internal structure of the cleaning apparatus according to FIG. 1. In the upper left-hand portion thereof there is shown the press or push button switch 3 which is connected with a conducter or line of a network cable 18. Such power network cable 18 is guided in a substantially snake-like configuration over the security or protection nubs 18a and is connected by means of its second conductor or line with a supply or connection terminal 5. Three connection cables, i.e. the main winding or coil and the auxiliary winding or coil, which lead to the electric drive, i.e. the synchronous motor, are guided to the connecting terminal 5 and are connected to a capacitor 6 (starting capacitor) via such connecting terminal or clamp 5.

The capacitor 6 serves for an increased starting torque of the synchronous motor. The cleaning bodies 8 and 9 which rotate towards one another, in other words in the direction of the arrows in opposite rotational sense, are shown in the right-hand portion of FIG. 6. Likewise there can be observed in the showing of FIG. 6 the kneading of the cleaning bodies 8 and 9 because of their different rotational speeds and also as a result of the action of the two strippers or scrapers 7b which are arranged in the cage element or holder device 7. In a tin collecting or catch container Z constructed as a space or chamber, the tin and scale particles are thus collected inside the cage or holder device 7.

In order to further increase the self-cleaning action of the two cleaning bodies 8 and 9 the axial spacing a in FIG. 6 is designed to the smaller than their mean diameter $$A = \frac{d1 + d2}{2}.$$

For the periodic cleaning of the equipment the holder or cage device 7 and the cleaning bodies 8 and 9 are removed from the cleaning apparatus and rinsed beneath a tap. Thus, the cleaning bodies 8 and 9 are sufficiently imbued or moistened to guarantee, for instance, the cleaning or the soldering bit or tip of a fine or precision soldering iron for the period of one day.

The wetting or imbuing device 20 for the cleaning bodies 8 and 9, which has been shown in FIG. 1 is an auxiliary device for use with larger soldering irons.

The apparatus according to the invention prevents the soldering bit from prematurely becoming rough and maculate, so that there is guaranteed the application of the heat of the soldering iron to the soldering locations with a good and constant conduction of the heat and the risk of "cold" soldering spots or joints is eliminated.

While there are shown and described preferred embodiments of the present invention, it is to be distinctly understood that the invention is not limited thereto but may be variously embodied and practised within the scope of the following claims. Accordingly,

What I claim is:

1. An apparatus for mechanically cleaning hot soldering iron bits contaminated with contaminants, such as tin oxides and soldering residues, comprising:
    at least two cooperating oppositely situated, counter-rotating cleaning bodies for cleaning a soldering iron bit of contaminants;
    each of said cleaning bodies having a lengthwise extending axis;
    means for mounting said two cleaning bodies such that the distance between said lengthwise extending axes is less than the mean diameter of said cleaning bodies, so that said cleaning bodies are continuously in mutual contact with one another at least at portions of their circumference; and
    means for rotatably driving said counter-rotating cleaning bodies at different rotational speeds, whereby said mutually contacting portions of said cleaning bodies exert a kneading action upon one another and thus a self-cleaning action upon one another, to thereby ensure that during cleaning of a contaminated soldering iron bit essentially only non-contaminated portions of said counter-rotating cleaning bodies come into contact with said contaminated soldering iron bit.

2. The apparatus as defined in claim 1, wherein:
    said two cleaning bodies are arranged such that said lengthwise extending axes thereof extend substantially axially parallel to each other; and
    each of said two cleaning bodies being arranged upon a related entrainment shaft.

3. The apparatus as defined in claim 1, wherein:
    said rotatably driving means comprise electrical drive means for driving said two cleaning bodies.

4. The apparatus as defined in claim 3, wherein:
    said electrical drive means comprises an individual drive for each of said two cleaning bodies.

5. The apparatus as defined in claim 1, wherein:
    said each of said two cleaning bodies possess a substantially brush-like surface.

6. The apparatus as defined in claim 1, wherein:
    said two cleaning bodies possess a substantially porous surface.

7. The apparatus as defined in claim 5 or 6, wherein:
    said two cleaning bodies are formed of a synthetic material of high molecular weight.

8. The apparatus as defined in claim 7, wherein:
    said synthetic material is polytetrafluoroethylene.

9. The apparatus as defined in claim 7, wherein:
    said synthetic material is a chlorinated rubber.

10. The apparatus as defined in claim 5 or 6, wherein:
    said cleaning bodies contain a natural organic substance.

11. The apparatus as defined in claim 10, wherein:
    said natural organic substance is a sponge.

12. The apparatus as defined in claim 10, wherein:
    said natural organic substance is linen.

13. The apparatus as defined in claim 1, further including:
    a housing within which there are mounted said cleaning bodies; and
    a tin collecting device provided for said housing.

14. The apparatus as defined in claim 13, wherein:
    said housing includes means enabling said housing to be selectively opened and closed.

15. The apparatus as defined in claim 13, wherein:
    said mounting means includes a removable cage member for mounting said cleaning bodies.

16. An apparatus for mechanically cleaning hot soldering iron bits contaminated with contaminants, such as tin oxides and soldering residues, comprising:
    at least two oppositely situated, interacting counter-rotating cleaning bodies formed of a sponge-like material for cleaning a soldering iron bit of contaminants;
    each of said sponge-like cleaning bodies having a lengthwise extending axis;
    means for mounting said two sponge-like cleaning bodies such that the distance between said lengthwise extending axes is less than the sum of the radii of said sponge-like cleaning bodies, so that said sponge-like cleaning bodies are continuously in mutual surface contact with one another at least at portions of their circumference;

means for rotatably driving said counter-rotating sponge-like cleaning bodies at different rotational speeds, whereby said mutually contacting portions of said sponge-like cleaning bodies exert a kneading action upon one another and thus a self-cleaning acting upon one another, to thereby ensure that during cleaning of a contaminated soldering iron bit essentially only non-contaminated portions of said counter-rotating, sponge-like cleaning bodies come into contact with said contaminated soldering iron bit.

* * * * *